United States Patent
Steinke

(10) Patent No.: US 7,218,014 B2
(45) Date of Patent: May 15, 2007

(54) WIND ENERGY SYSTEM, AS WELL AS A METHOD FOR OPERATING SUCH A WIND ENERGY SYSTEM

(75) Inventor: Jürgen Steinke, Albbruck (DE)

(73) Assignee: ABB Schweiz AG, Baden (CH)

( * ) Notice: Subject to any disclaimer, the term of this patent is extended or adjusted under 35 U.S.C. 154(b) by 808 days.

(21) Appl. No.: 10/308,036

(22) Filed: Dec. 3, 2002

(65) Prior Publication Data
US 2006/0097519 A1 May 11, 2006

(30) Foreign Application Priority Data
Dec. 10, 2001 (EP) ................................ 01811203

(51) Int. Cl.
H02J 3/00 (2006.01)
F03D 9/02 (2006.01)
H02H 7/06 (2006.01)

(52) U.S. Cl. ........................................................ 307/84
(58) Field of Classification Search ................ 290/44; 307/84; 361/20
See application file for complete search history.

(56) References Cited

U.S. PATENT DOCUMENTS 3,260,555 A * 7/1966 Packer ........................ 303/189
6,631,080 B2 * 10/2003 Trimble et al. ............... 363/34
6,946,750 B2 * 9/2005 Wobben ........................ 290/44

FOREIGN PATENT DOCUMENTS

CH 19620906 A1 1/1998
WO 00/74198 A1 12/2000

* cited by examiner

Primary Examiner—Brian Sircus
Assistant Examiner—Hal I. Kaplan
(74) Attorney, Agent, or Firm—Buchanan Ingersoll & Rooney PC

(57) ABSTRACT

Systems and methods of the present invention are directed to wind energy. Wind rotors (1) drive at least two generators (2) which each have a corresponding rectifier unit (3). The rectifier unit (3) being an active rectifier having drivable power semiconductor components. An energy storage circuit (4) is associated with each rectifier unit (3) and is connected in parallel to a first busbar system (7). Each energy storage circuit (4) having at least one DC voltage capacitance, and the first busbar system (7) having a first protection switch (5) in at least one connection.

7 Claims, 1 Drawing Sheet

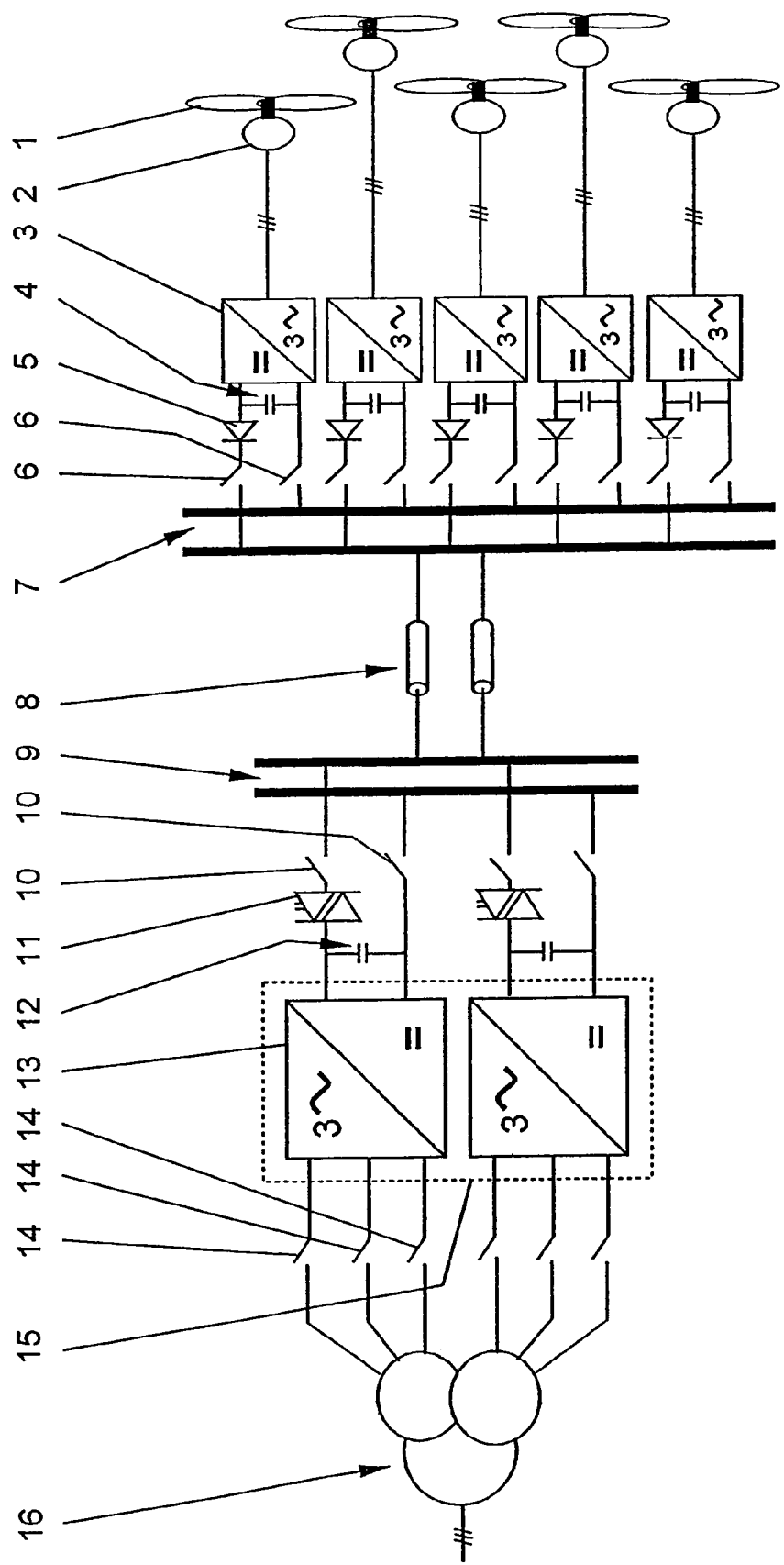

WIND ENERGY SYSTEM, AS WELL AS A METHOD FOR OPERATING SUCH A WIND ENERGY SYSTEM

FIELD OF THE INVENTION

The invention relates to the field of wind energy systems and is based on a wind energy system and a method for operating such a system.

BACKGROUND OF THE INVENTION

Wind energy systems, which are now being used increasingly as alternative energy sources as energy resources disappear, are normally set up on land or at sea, close to the coast. One such wind energy system is disclosed in WO 00/74198 A1. The wind energy system has at least two wind rotors, with each rotor being mechanically connected to a generator, which it drives. Each of the generators is connected to an associated passive rectifier unit. All the rectifier units also have an energy storage circuit on their DC voltage sides, with each energy storage circuit being formed by appropriate inductances. However, due to their large and complex structure, these inductances result in additional material costs and require a correspondingly large amount of space. Each energy storage circuit is followed by a step-up controller for matching the direct current to the corresponding rectifier unit. The energy storage circuits in WO 00/74198 A1, together with the downstream step-up controllers, are connected in parallel to a busbar system and feed electrical energy into a transmission system, with the transmission system normally being in the form of a two-phase busbar. For a long transmission system, a DC/DC controller is provided on the input side for matching to the high DC voltage which is required for low-loss power transmission. The transmission system is connected to a network coupling device, which has an input circuit formed by a DC voltage capacitance. Furthermore, the DC voltage side of an inverter for the network coupling device is connected to the input circuit, with the AC voltage side of the inverter being coupled via a network transformer to a conventional electrical supply network.

Problems occur with a wind energy system such as this when one or more rectifier units and/or the inverter for the network coupling device fail, and the transmission system and hence all the energy storage circuits which are connected to it and the input circuit of the network coupling device are short-circuited. One known solution is for all of the energy storage circuits to be actively short-circuited by means of their step-up controllers, in particular by means of a thyristor in the appropriate step-up controller, and for the input circuit to be short-circuited by means of the inverter. Simultaneous short-circuiting results in the short-circuit currents being distributed uniformly between all the rectifier units and the inverter. The electrical AC voltage supply network is then disconnected in order to interrupt the short-circuit currents, by means of a conventional network circuit breaker. If one rectifier unit is defective, this must then be disconnected in order to allow operation of the wind energy system to be resumed. However, with disconnection such as this, in particular of the appropriate energy storage circuit, it must be possible to cope with the short-circuit current which flowed prior to this until the associated generator has been braked to rest. In the wind energy system as claimed in WO 00/74198 A1, no provision is made for any capability for such disconnection from the energy storage circuit, which is accordingly not possible. Furthermore, signals must be transmitted quickly to the step-up controllers and to the inverter in order to make it possible to initiate the simultaneous active short circuit, as mentioned above, in the event of a defect in one or more rectifier units and/or the inverter. However, signal transmission such as this is associated with a high level of complexity in terms of additional components and material, particularly if such signals are intended to be transmitted over a long distance. Overall, in a wind energy system as claimed in WO 00/74198 A1, further operation of the components which are not defective or have not failed without any interruption is impossible in the event of a failure or a defect in one or more of the rectifier units and/or in the inverter for the network coupling device.

SUMMARY OF THE INVENTION

The object of the invention is therefore to specify a wind energy system in which a rectifier unit which is connected to a generator in the wind energy system can be selectively disconnected from the wind energy system if it fails and/or becomes defective, with continued operation of the remaining components of the wind energy system without interruption being possible, and which is particularly simple and robust and can be implemented with little circuitry complexity. It is also intended to specify a method by means of which the wind energy system according to the invention can be operated in a particularly simple and efficient manner.

The wind energy system according to the invention comprises at least two generators which are driven by means of wind rotors, with a rectifier unit being provided for each generator, to whose inputs the associated generator is connected. Furthermore, the wind energy system has an energy storage circuit for each rectifier unit, with the energy storage circuit being connected to the outputs of the associated rectifier unit. A first busbar system is also provided, to which the energy storage circuits are connected in parallel. The first busbar system is connected to a transmission system, with a network coupling device being provided, to which the transmission system is connected on the input side. Furthermore, the network coupling device is coupled via a network transformer to an electrical AC voltage supply network. According to the invention, each rectifier unit is in the form of an active rectifier unit with drivable power semiconductor components. Furthermore, each energy storage circuit has at least one DC voltage capacitance and, in at least one connection for the first busbar system, at least one first protection switch in the form of a semiconductor switch. The active rectifier unit and the energy storage circuit together with the DC voltage capacitance advantageously make it possible to set a variable, load-independent DC voltage for the energy storage circuit. In consequence, the voltage of the transmission system which (as mentioned above) is connected via the first busbar system to the energy storage circuits can be increased, so that the electrical power loss can advantageously be reduced, in particular in a transmission system which, for example, extends over a long distance. Furthermore, in the event of a defect and/or a failure of one or more rectifier units, a current flow which is greater than the maximum permissible current value from the first busbar system to the respective energy storage circuit and/or a current flow from the energy storage circuit to the first busbar system can be interrupted by the respective first protection switch in a desirable manner. This interruption results in fast, selective disconnection of the appropriate rectifier unit from the wind energy system, thus advantageously allowing continued operation, without any interruption, of the remaining components of the wind energy system. The first protection switch, in the form of a semiconductor switch, in this case advantageously remains undamaged and is not destroyed.

Furthermore, the wind energy system requires only a minimum number of components and, in particular owing to the use of the DC voltage capacitances for the energy storage circuits, occupies little space and can be implemented with a small amount of circuitry complexity. Furthermore, by virtue of its simple design and the small number of components, the wind energy system according to the invention is highly convenient for maintenance and repair and, furthermore, is very robust.

In the method according to the invention for operating the wind energy system, electrical energy for feeding to the electrical AC voltage supply network is produced by the at least two generators which are driven by means of wind rotors. According to the invention, when a defect and/or failure occurs in one of the rectifier units, the associated first protection switch or switches is or are opened. Since the associated first protection switch or switches is or are opened in the event of a defect or failure of a rectifier unit, the corresponding rectifier unit is disconnected easily and quickly from the wind energy system, so that the wind energy system can advantageously continue to operate, without any interruption. The method according to the invention thus allows particularly efficient operation of the wind energy system, and, furthermore, particularly high wind energy system availability can be achieved.

These and further objects, advantages and features of the present invention will become clear from the following detailed description of preferred exemplary embodiments of the invention, in conjunction with the drawing.

BRIEF DESCRIPTION OF THE DRAWINGS

In the drawings:

The FIGURE shows one embodiment of a wind energy system according to the invention.

The reference symbols used in the drawing, and their meanings, are listed in summarized form in the list of reference symbols. In principle, identical parts are provided with the same reference symbols in the FIGURE. The described embodiment represents an example of the subject matter of the invention, and has no restrictive effect.

DETAILED DESCRIPTION OF THE INVENTION

The FIGURE shows one embodiment of a wind energy system according to the invention. The wind energy system comprises at least two generators 2 which are driven by means of wind rotors 1. Furthermore, a rectifier unit 3 is provided for each of these generators 2, to whose inputs, in particular AC voltage inputs, the associated generator 2 is connected. Each rectifier unit 3 has an energy storage circuit 4, which is connected to outputs, in particular to DC voltage outputs, of the associated rectifier unit 3. As shown in the FIGURE, all the energy storage circuits 4 are connected in parallel to a first busbar system 7, with a transmission system 8 also being connected to the first busbar system 7. Furthermore, as shown in the FIGURE, a network coupling device 15 is provided, to which the transmission system 8 is connected on the input side. As shown in the FIGURE, the network coupling device 15 is coupled via a network transformer 16 to an electrical AC voltage supply network, although this is not shown, for the sake of simplicity.

According to the invention, each rectifier unit is in the form of an active rectifier unit with drivable power semiconductor components, and each energy storage circuit 4 also has at least one DC voltage capacitance, thus advantageously making it possible to set a variable, load-independent DC voltage for the respective energy storage circuit 4 by means of the associated active rectifier unit 3. It is thus possible to increase the voltage of the transmission system 8. Particularly in the case of a transmission system 8 which, for example, in the case of an offshore application of the wind energy system extends over a long distance, such a voltage increase makes it possible to particularly efficiently reduce the electrical power loss. This advantageously means that there is no need for any step-up controller, as is known from the prior art. It is likewise advantageously possible to save a DC/DC controller, with a complex drive for a large voltage increase, that is likewise known from the prior art, and this need be used only optionally for extremely long transmission paths.

Furthermore, in at least one connection for the first busbar system 7, each energy storage circuit 4 has, according to the invention, at least one first protection switch 5 in the form of a semiconductor switch. In the event of a defect and/or a failure in one or more rectifier units 3, a current flow which is greater than the maximum permissible current value from the first busbar system 7 to the respective energy storage circuit 4 and/or a current flow from the energy storage circuit 4 to the first busbar system 7 can be interrupted quickly in a desirable manner by the respective first protection switch 5, thus resulting in selective disconnection of the appropriate rectifier unit 3 from the wind energy system. This advantageously allows uninterrupted further operation of the remaining components of the wind energy system.

As shown in FIG. 1, the first protection switch 5 is preferably in the form of a semiconductor diode. This allows the circuitry and control complexity to be correspondingly reduced, since the first protection switch 5 does not require any complex drive.

As shown in the FIGURE, the first protection switch 5 is preferably in the form of a semiconductor diode. This allows the circuitry and control complexity to be correspondingly reduced, since the first protection switch 5 does not require any complex drive.

Furthermore, in each connection for the first busbar system 7, each energy storage circuit 4 shown in FIG. 1 has at least one first isolating device 6, with the first isolating device 6, for example in the form of a mechanical switch, being used for DC isolation of the energy storage circuit 4 from the first busbar system 7. This first isolating device 6 thus advantageously makes it possible to DC-isolate the defective rectifier unit 3 from the wind energy system, in particular from the first busbar system 7. The first isolating device 6 is preferably designed for isolation of a state in which virtually no current is flowing and can be operated by hand, so that the circuitry and control complexity can be kept low.

According to the invention, the network coupling device 15 as shown in FIG. 1 is connected via a second busbar system 9 to the transmission system 8. The network coupling device 15 also has at least one inverter 13 and in each case one input circuit 12 for each inverter 13, with the input circuits 12 being connected in parallel to the second busbar system 9 if the number of inverters is greater than or equal to 2. Each input circuit 12 preferably has at least one DC voltage capacitance. The advantage of parallel connection when the number of inverters is greater than or equal to two is that partial redundancy of the non-defective inverters 13 can be achieved in the event of one failure. Furthermore, the number of inverters greater than or equal to two makes it possible to achieve a reduction in the harmonics by means of a suitable transformer circuit for the network transformer 16. The DC voltage capacitance also has the advantage that the current harmonics at the switching frequency which are produced by the associated inverter 13 can be dissipated from the shortest possible paths and can thus very largely be kept away from the transmission system 8.

Furthermore, in at least one connection for the second busbar system 9, each input circuit 12 according to the invention has at least one second protection switch 11 in the form of a semiconductor switch, with the second protection switch 11 advantageously being in the form of a drivable power semiconductor switch. In the event of a defect and/or a failure of one or more inverters 13, a current flow which is greater than the maximum permissible current value from the second busbar system 9 to the respective input circuit 12 and/or a current flow from the input circuit 12 to the second busbar system 7 can be interrupted quickly by means of the respective second protection switch 11, thus resulting in selective disconnection of the corresponding inverter 13 from the wind energy system. This advantageously allows uninterrupted continued operation of the remaining components of the wind energy system. A detector device is installed in order to identify when the current flow exceeds the already mentioned maximum permissible current value, in order to make it possible to switch off the second protection switch 11, which is in the form of a drivable power semiconductor switch, via a drive device. The corresponding detector devices and drive devices for the individual second protection switches 11 are omitted, for the sake of simplicity.

Furthermore, in each connection for the second busbar system 9, each input circuit 12 according to the invention has at least one second isolating device 10, with the second isolating means 10 being used for DC-isolation of the input circuit 12 from the second busbar system 9. The second isolating device 10 advantageously makes it possible to DC-isolate the defective inverter 13 from the wind energy system, in particular from the second busbar system 9. The second isolating device 10 is preferably designed for isolating a state in which virtually no current is flowing, is designed such that it can be operated by hand and, for example, mechanically, so that the circuitry and control complexity can be kept low.

As shown in the FIGURE, each inverter 13 is connected by its AC voltage side of the network transformer 16, with at least one third isolating device 14 being provided in each connection for the network transformer 16. The third isolating device 14 is used for DC-isolation of the inverter 13 from the network transformer 16. It is thus advantageously possible to DC-isolate the defective inverter 13 from the wind energy system, in particular from the network transformer 16. Furthermore, in the start-up phase of the wind energy system when the DC voltage capacitance of the input circuit 12 is being initially charged by means of an initial-charging device (which is not shown for the sake of simplicity), the network transformer 16 can be kept isolated from the inverter 13 by means of the third isolating device 14 until the DC voltage capacitance has been charged. Together with the second isolating means 10, the third isolating device 14 can switch the associated inverter 13 such that it is not live, for maintenance of this inverter 13 without it being defective or having failed, during which process it is advantageously possible to continue to operate the wind energy system.

The third isolating device 14 is preferably designed for isolating a state in which virtually no current is flowing, is designed such that it can be operated by hand and, for example, mechanically, so that the circuitry and control complexity, as already mentioned for the first and second isolating means 6, 10, can also be kept low for the third isolating device 14.

In the method according to the invention for operating the wind energy system according to the invention, electrical energy for feeding the electrical AC voltage supply network is produced by the at least two generators 2 which are driven by means of wind rotors 1. According to the invention, when a defect and/or a failure occurs in one of the rectifier units 3, the associated first protection switch or switches 5 is or are opened. This opening of the first protection switch or switches 5 in the event of a defect or a failure in the corresponding rectifier unit 3 results in this rectifier unit 3 being disconnected in a simple manner and quickly from the wind energy system, in particular from the first busbar system 7, so that the wind energy system can advantageously continue to be operated without any interruption.

Furthermore, in accordance with the method according to the invention, after the opening of the associated first protection switch or switches 5, the defective rectifier unit 3 is DC-isolated from the first busbar system 7 by means of the associated first isolating device 6. This DC-isolation by device of the first isolating device 6 advantageously allows the defective rectifier unit 3 to be repaired or replaced safely.

According to the invention, when a defect occurs in one of the inverters 13 the associated second protection switch or switches 11 is or are opened. This opening of the second protection switch or switches 11 in the event of a defect or failure in the corresponding inverter 13 results in this inverter 13 being disconnected quickly and easily from the wind energy system, in particular from the second busbar system 9, so that it is advantageously possible to continue to operate the wind energy system without any interruption. Furthermore, after the opening of the associated second protection switch or switches 11, the defective inverter 13 is DC-isolated from the second busbar system 9 by means of the associated second isolating device 10. The DC-isolation by the second isolating means 10 advantageously allows the defective inverter 13 to be repaired or replaced safely. Furthermore, the defective inverter 13 is, additionally, advantageously DC-isolated from the network transformer 16 by means of the associated third isolating device 14, thus resulting in additional safety when repairs are being carried out on the defective inverter 13, or an inverter 13 requiring maintenance, or when such an inverter 13 is being replaced.

Overall, the wind energy system according to the invention represents an extremely simple and cost-effective as well as operationally reliable and safe solution since, in particular, components can be disconnected selectively from the wind energy system when they fail and/or become defective, thus ensuring continued operation of the remaining components of the wind energy system without any interruption. In addition, the method according to the invention allows simple, stable and very efficient operation of the wind energy system according to the invention, thus making it possible to achieve particularly high wind energy system availability.

LIST OF REFERENCE SYMBOLS

1 Wind rotor
2 Generator
3 Rectifier unit

4 Energy storage circuit
5 First protection switch
6 First isolating means
7 First busbar system
8 Transmission system
9 Second busbar system
10 Second isolating means
11 Second protection switch
12 Input circuit
13 Inverter
14 Third isolating means
15 Network coupling device
16 Network transformer

The invention claimed is:

1. A wind energy system comprising
at least two generators which are driven by means of wind rotors,
a rectifier unit for each generator, to whose inputs the associated generator is connected,
an energy storage circuit for each rectifier unit, with the energy storage circuit being connected to the outputs of the associated rectifier unit,
a first busbar system, to which the energy storage circuits are connected in parallel, a transmission system, which is connected to the first busbar system,
a network coupling device, to which the transmission system is connected on the input side, with the network coupling device being coupled via a network transformer to an electrical AC voltage supply network,
wherein each rectifier unit is in the form of an active rectifier unit with drivable power semiconductor components,
in that each energy storage circuit has at least one DC voltage capacitance,
in that, in at least one connection for the first busbar system, each energy storage circuit has at least one first protection switch in the form of a semiconductor switch,
wherein the network coupling device is connected via a second busbar system to the transmission system,
wherein the network coupling device has at least one inverter, and in each case one input circuit for each inverter, and
in that, if a number of inverters is greater than or equal to two, the input circuits are connected in parallel to the second busbar system, and
wherein, in at least one connection for the second busbar system, each input circuit has at least one second protection switch in the form of a semiconductor switch.

2. The wind energy system as claimed in claim 1, wherein the first protection switch is a semiconductor diode.

3. The wind energy system as claimed in claim 1, wherein, in each connection for the first busbar system, each energy storage circuit has at least one first isolating means, with the first isolating means being used for DC isolation of the energy storage circuit from the first busbar system.

4. The wind energy system as claimed in claim 1, wherein each input circuit has at least one DC voltage capacitance.

5. The wind energy system as claimed in claim 1, wherein the second protection switch is a drivable power semiconductor switch.

6. The wind energy system as claimed in claim 1, wherein, in each connection for the second busbar system, each input circuit has at least one second isolating means, with the second isolating means being used for DC-isolation of the input circuit from the second busbar system.

7. The wind energy system as claimed in claim 1, wherein each inverter is connected by its AC voltage side to the network transformer and at least one third isolating means is provided in each connection for the network transformer, with the third isolating means being used for DC-isolation of the inverter from the network transformer.

* * * * *